United States Patent [19]

Mellor

[11] Patent Number: 4,619,302

[45] Date of Patent: Oct. 28, 1986

[54] RIM AND TIRE CLAMP

[76] Inventor: Asa B. Mellor, Rte. 6, Box 131, Millersburg, Ohio 44654

[21] Appl. No.: 653,900

[22] Filed: Sep. 24, 1984

[51] Int. Cl.⁴ ............................................. B60C 5/16
[52] U.S. Cl. .................................................. 152/398
[58] Field of Search ............... 152/397, 398, 409, 410; 301/12 R, 13 SM, 36 WP

[56] References Cited

U.S. PATENT DOCUMENTS

| Re. 30,036 | 6/1979 | De Regnaucourt et al. | 301/13 SM |
| 1,860,001 | 5/1932 | Vanderveer | 301/12 R |
| 4,142,569 | 3/1979 | Walther et al. | 152/397 |
| 4,427,237 | 1/1984 | Beegle | 301/13 SM |

FOREIGN PATENT DOCUMENTS 416310 11/1946 Italy ............................. 301/13 SM Primary Examiner—Robert B. Reeves
Assistant Examiner—Carol L. Olson
Attorney, Agent, or Firm—Fay, Sharpe, Fagan, Minnich & McKee

[57] ABSTRACT

Multi-piece wheel and rim construction primarily for use with over the road vehicles of the truck and bus types, wherein the parts used to position the rim and tire combinations which avail of a removable lock ring seated in a gutter in the rim are formed to not only removably position the rim and tire assemblies on wheels, but also provide a safety factor by the provision of clamp and stop members having portions which extend into the path which would be followed by accidental displacement of the lock ring during inflation or in travel use.

3 Claims, 7 Drawing Figures

FIG. 5
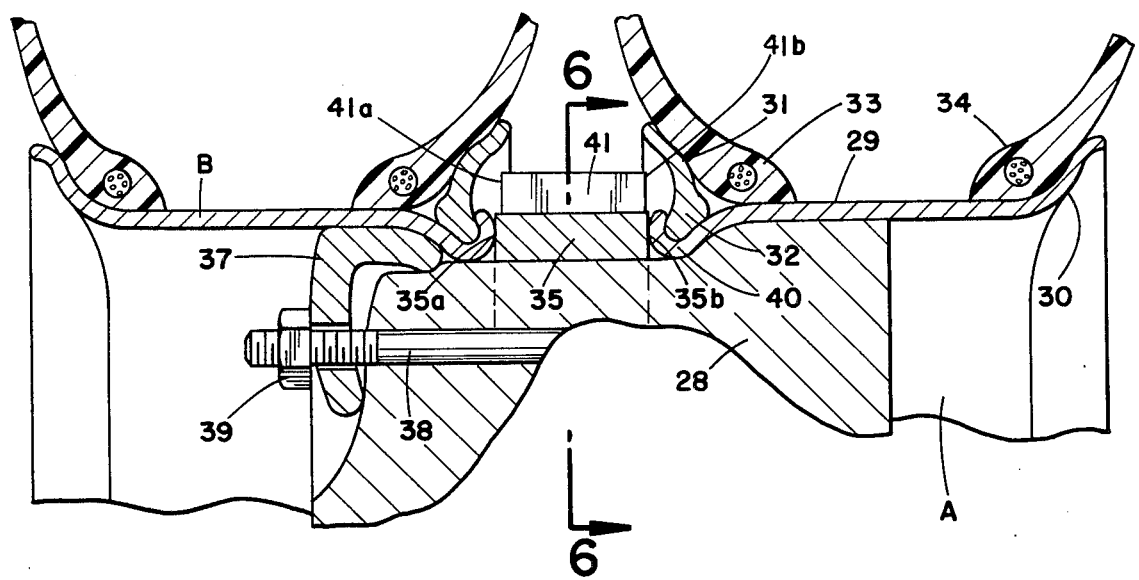
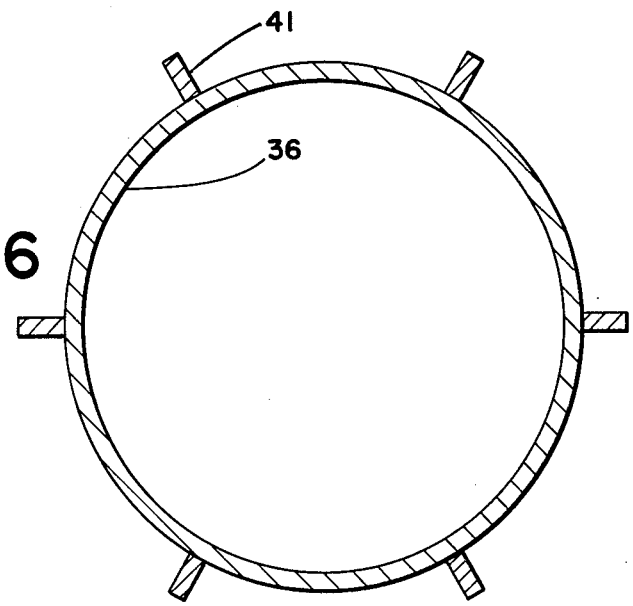
FIG. 6
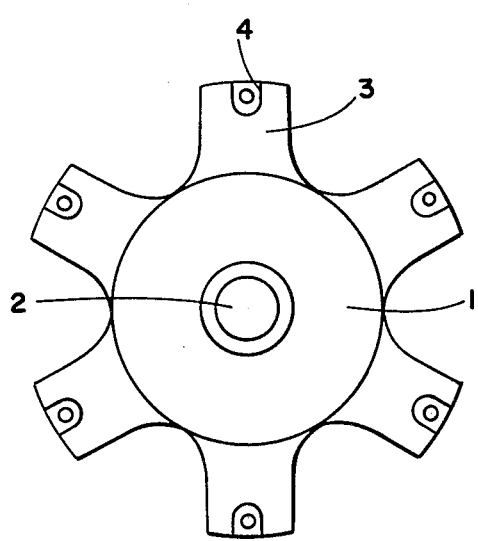
FIG. 7

RIM AND TIRE CLAMP

BACKGROUND OF THE INVENTION

This invention relates to rim and wheel construction and particularly to such construction which avails of so called multi-piece rims intended to be mounted upon and removed from wheels as they in turn support the usual pneumatic tires thereon. While it is usually the case that a suitable innertube is used in such combinations under many circumstances this would not be neccessary but is usually the case.

In such prior art construction, the rims of truck tires, this being particularly the example used for providing the basis for consideration, include a wheel which in most instances is multi-spoked and the wheel of course being mounted upon an axle for rotation thereon whether driving the vehicle or whether one supporting the same for steering only.

In any event the rims are intended to be mounted upon such wheels and fastened thereto by removable parts which are arranged to clamp the rim and tire in position on the wheel so as to make the same susceptible of driving support for the vehicle as a whole. Usually there are a large number of wheels on such trucks including the steering wheels which are so called single wheels and the driving wheels which are usually dual in nature.

The rims of such tire and wheel combinations are so called multi-piece in that they are equipped with rings which are known as gutter rings, split so as to be removable from the rim and seated in a gutter formed in the rim and likewise providing a flange against which the tire bead as a result will be seated and thus prevented from displacement thereby.

The provision of such split rings for locking and specifically the gutter ring as mentioned, has often resulted in dangerous occurences wherein if the ring is not seated suitably in the gutter of the rim it may fly off during inflation and has been known to do this, resulting in serious injury and even death in some cases where the ring has acted almost like an explosive or exploding missile.

Thus it is of course desirable to minimize and to prevent such occurrences, and to this end cages and the like have been provided for inflating the tires under those circumstances where repairs have been made or where the same is initially to be positioned on the rim for subsequent use. The provision of the cages so called is in itself obviously a further matter of cost and it would be desirable to eliminate such provision if it is possible so to do.

The present invention avails largely of the previously existing parts and is however further arranged so that the cages and like restraining means to prevent damage or injury by inadvertent or accidental displacement of gutter rings, are not required and is thus obviously desirable where this combination of rim and wheel and tire is used in the trucking or other like industry.

DETAILED DESCRIPTION OF THE DISCLOSURE

As before indicated, the tire rim wheel combination, involving a multi-piece rim, is a very common arrangement and not only involves the single steering or support wheel in which it is used but also the dual wheel combinations likewise in larger trucks and the various improvements provided by this invention including the added safety and virtually substantially eliminates explosive dangers of the removable rings, is more particularly illustrated in the drawings supplied hereto and described in relation therewith such drawings including by way of detailed description.

FIG. 1 which discloses a fragmentary cross-sectional view of a tire rim and wheel combination in disclosing the invention hereof.

FIG. 5 discloses fragmentarily a dual wheel rim combination which also provides additional safety by the provision of limiting means therein.

FIG. 6 discloses a sectional view of a spacer part equipped with the means hereof and used in the dual wheel combination of FIG. 5.

FIG. 7 is a common type of wheel shown in elevation for illustrative purposes and to clarify certain of the elements described hereinafter.

FURTHER DETAILED DESCRIPTION OF THE INVENTION

Figure 1:
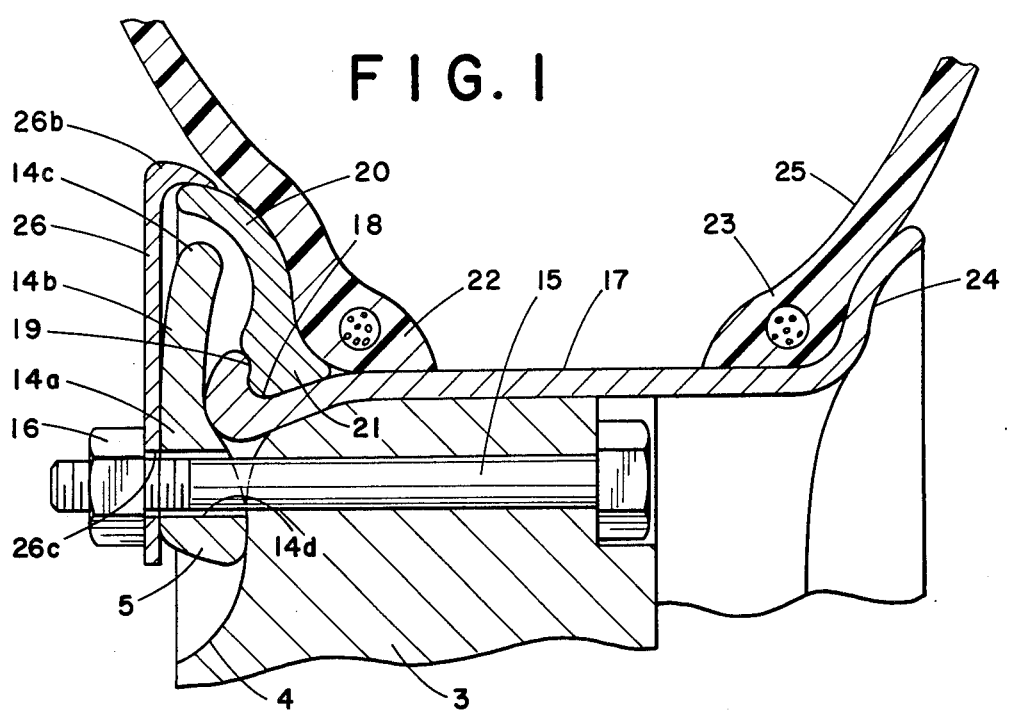
Figure 3:
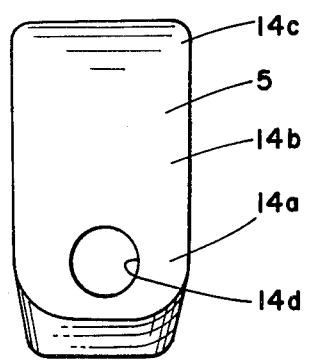
FIG. 3 is a plan view of one of the elements or clamp members which are provided for the current invention.
Figure 4:
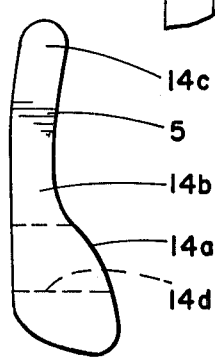
FIG. 4 is a side view of such clamp member.

Turning now to a consideration of FIG. 1 in the drawing, and taken in conjunction with disclosure of FIG. 7, a wheel generally denoted 1 is provided centrally thereof with an axle receiving opening 2 therein and a series of spokes such as 3 extending radially outwardly therefrom, this being a very common type or usual type of wheel having certain socket sections such as 4 at the extremity of each spoke 3 to receive and position clamp members such as illustrated in FIG. 3 and denoted 5 therein.

In FIG. 1, the spoke illustrated fragmentarily and denoted 3 as before suggested, includes at its extremity the socket 4 therein previously mentioned in which is mounted on each spoke the clamp member 5 which provides the heart and soul of this disclosure and will be further described upon reaching the point in the description which particularly applies thereto.

Figure 2:
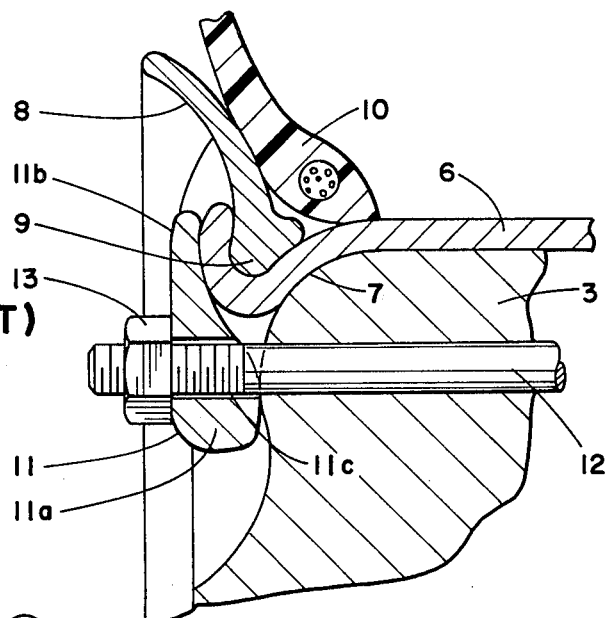
FIG. 2 is a fragmentary sectional view similar to FIG. 1 disclosing the present arrangement of parts which offers the potential danger heretofore suggested.

Turning further to a consideration of the usual type of construction as disclosed in FIG. 2, the fragmentary part of a spoke 3 of the wheel is shown involving a rim in this instance denoted 6 having a gutter ring receiving or lock ring receiving portion arranged peripherally and denoted at 7 in which is seated a gutter ring or lock ring denoted 8, this gutter or lock ring having a locking part or portion 9 mounted directly in the gutter 7 previously mentioned, the ring 8 having the tire bead portion 10 positioned thereagainst as the said tire is inflated.

The rim 6 is retained in position on the spoke and on the wheel which is of course a wheel like that disclosed in FIG. 7 and denoted 1, by means of the clamp parts 11 one of which is provided for each spoke and fastened by a suitable bolt 12 extending through the end of the spoke 3 with a nut such as 13 provided to engage the clamp part member 11.

The clamp member 11 in this instance is provided with a body 11a and a rim engaging portion 11b with a substantially central opening 11c to provide for mounting of the clamp member as a whole on the bolt 12.

As will be apparent the body portion 11a upon tightening of the nut 13 will fulcrum about the nut and cause the rim engaging portion 11b to engage the gutter ring section of the rim and thus fasten the rim to the spokes 3 of the wheel for driving and other support relation of the wheel and rim combination.

It is apparent from this disclosure that if the lock ring 8 is accidentally displaced it can move outwardly, axially and if anything is in the way will undoubtedly damage it and if a person is in the path of that could seriously injure such person.

Turning now to a consideration of the details of the invention hereof, it will be seen that the clamp member such as 5 of FIG. 3 is similarly formed in some respects to the clamp member 11 previously mentioned in describing FIG. 2, but in this instance is of substantially longer or greater radial extent when in position so as to include not only a body portion 14a, a rim engaging portion 14b, but also a tongue portion 14c extending beyond the rim engaging portion 14b.

A suitable opening 14d is provided to fasten such members to the spokes such as 3 of the wheel 1 as previously suggested.

The foregoing is illustrated in FIG. 1 with the clamp member 5, there being one provided for each spoke as will be understood arranged on the end of the spoke 3 so that the body portion 14a is against the recess or socket 4 and positioned thereby, in this instance the bolt 15 extending through the spoke 3 and having a nut 16 arranged thereon to clamp the clamp member in place and cause the rim engaging portion 14b to engage the gutter or lock ring portion of the rim in this instance denoted 17, the lock ring receiving portion 18 and the gutter therein specifically denoted 19. In this instance the gutter or lock ring is denoted 20 with the locking section thereof 21 and adapted to engage the tire bead 22 there being another tire bead 23 obviously at the opposite side of the rim engaging a flange 24 of the rim 17.

The ring 20 previously mentioned of course forms the opposite flange to in turn provide for mounting the tire which will be denoted 25 for the purposes hereof.

The tongue portion of each of the clamp members 5, denoted 14c as previously stated, is arranged so as to extend into the path of travel of and actually into close proximity with the outer surface of the lock ring or gutter ring 20, in contrast to the previously mentioned clamp member 11. Thus accidental displacement of the gutter or lock ring 20 is impossible with the disclosure hereof as far as can be ascertained. It is even the case that the tire and rim combination shown in FIG. 1 with the lock ring 20 in place, prior to inflation of the tire 25 can in fact and should in fact be mounted on the wheel on the spokes obviously thereof before inflation of the tire is resorted to, such inflation usually being confined by a tube not illustrated but obviously one which could be provided.

Since the clamp members hereof do extend into the axial path of movement of the lock ring 20, it is not possible for the gutter ring to escape from the clamp members.

This arrangement has been tested and has been found to in fact provide a safe arrangement when the tire is inflated in place upon the wheel, a procedure which cannot be safely undertaken in prior construction.

In order to additionally assure that the provision of the tongue portion 14c of the lock members 5 in each instance will in fact provide the necessary safety and as an additional safety factor, a further stop part denoted 26 may be provided for each stop member. These stop members are generally rectangular parts in plan having the hook shaped extremity 26b engaging the outer circumferential edge of the lock ring as shown in FIG. 1 in close proximity to the outer surface of the member 5 being somewhat longer in extent than the tongue portion 14c in each case. This stop member will be fastened by the nut 16 also, there being provided a suitable opening 26c therein for that purpose.

It is noted that the stop member is substantially coextensive with and about the same shape as the clamp members 5 previously referred to.

The foregoing illustrates the concept hereof as being one wherein safety means is provided to prevent the lock or gutter ring of multi-piece rim and tire combinations from being explosively or accidentally or otherwise displaced when not desired, even by deflation such as takes place when a puncture or blowout occurs.

Turning now to FIG. 5, a dual wheel construction which avails of a like concept to that heretofore described for prevention of the lock rings from explosively being displaced, is shown in fragmentary view in FIG. 5 as including a spoke 28 of a dual wheel arrangement, the spoke 28 being substantially wider in axial extent than the spoke 3 of the wheel for a single tire previously described.

In this instance the wheel including the spoke 28 is designed to have mounted thereon the dual rim and tire combinations each of which is identical to the rim and tire combination previously mentioned, in this instance the rim being denoted 29, the flange thereon fixed thereto at 30 with a lock ring or gutter ring 31 in position in the gutter portion 32 of the rim 29 with the locking element or section of the lock ring or gutter ring 31 being denoted 32.

The tire beads in each instance are denoted at 33 and 34 correspondingly it being noted of course that the rim and tire combinations are oppositely mounted so to speak with the inner tire and rim which for distinctive purposes hereof will be denoted A arranged oppositely from the rim and tire unit B which is the outer rim and tire unit of a dual wheel combination.

In all other aspects the tires, rims, gutter or lock rings and respective parts thereof are identical in this instance however the combination is provided with a spacer which is denoted 35 and is cylindrical nature including the cylindrical body as shown in FIG. 6 denoted at 36 which is a relatively thick tubular part having opposite edges such as 35a and 35b.

Usually this cylindrical spacer is applied as shown in FIG. 1 so as to have the respective edges 35a and 35b in contact with the gutter ring sections of the rims of the respective tire and rim constructions A and B in contact and maintained thereby by a suitable L-shaped clamp member 37 which is fastened by a bolt 38 and nut 39, in such a manner as to wedgingly position the rim and tire B on the wheel 28 and likewise the rim and tire combination A against a suitable shoulder 40 provided on the wheel 28, this shoulder extending peripherally around the extremities of each of the spokes 28.

Thus the usual driving relationship of the tire and rim combinations A and B is established, but the improvement offered hereby comprises the abutment parts radially arranged being of rectilinear formation as denoted at 41, and of sufficient extent axially so that the ends 41a and 41b extend into the path which might be followed by the lock rings 31 escaping from the guters of one or more of the tire and rim combinations A or B. Thus the safety factors which are provided by the disclosure of FIG. 1 are likewise provided hereby since the ends 41a and 41b do in fact act as the tongue portions 14c of the clamp members 5 previously described.

It will be understood that these rectilinear members 41 and suitably fastened by welding for example to the outer surface of the cylindrical ring 36 and thus are fixed there and a suitable number provided to make sure that all aspects of each of the rings is under control.

I claim:

1. A multi-piece rim and wheel construction for retaining an associated tire thereon, said rim and wheel construction comprising:

a wheel having a central axle connecting portion and radially extending spokes extending outwardly therefrom;

a rim mounted adjacent an outer end of said radially extending spokes, said rim having a substantially cylindrical body, a first tire bead engaging flange at one edge and a lock ring receiving portion at the other edge;

a lock ring received in said lock ring receiving portion at an inner radial position, said lock ring including a second tire bead engaging flange extending radially outward to an outer radial position whereby an associated tire is retained between said tire bead engaging flanges;

a clamp on said wheel having a first body portion fixedly retained to said wheel at an innermost radial position, a flange engaging portion extending outwardly adjacent to said lock ring inner radial position, and a tongue portion extending outwardly from said flange engaging portion to a position adjacent said lock ring outer radial position for inhibiting axial displacement of said lock ring; and, a stop member fixedly retained to said ring extending continuously from said innermost radial position to an outermost radial position engaging an outer circumferential edge of said lock ring whereby an additional safety factor is incorporated into said construction.

2. The rim and wheel construction as defined in claim 1 further including apertures extending through each of said spokes, clamp, and stop member cooperating with an elongated bolt for fixedly fastening to said wheel.

3. The rim and wheel contruction as defined in claim 1 wherein said member includes a hook-shaped outer end engaging said outer circumferential edge of said lock ring.

* * * * *